(12) United States Patent
Batz et al.

(10) Patent No.: US 9,210,122 B2
(45) Date of Patent: *Dec. 8, 2015

(54) SYSTEM AND METHOD FOR INSPECTING DOMAIN NAME SYSTEM FLOWS IN A NETWORK ENVIRONMENT

(71) Applicant: CISCO TECHNOLOGY, INC., San Jose, CA (US)

(72) Inventors: Robert Batz, Raleigh, NC (US); Robert Mackie, Cary, NC (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/661,058

(22) Filed: Mar. 18, 2015

(65) Prior Publication Data
US 2015/0195245 A1 Jul. 9, 2015

Related U.S. Application Data

(63) Continuation of application No. 12/621,114, filed on Nov. 18, 2009, now Pat. No. 9,015,318.

(51) Int. Cl.
*H04L 29/12* (2006.01)
*H04L 12/14* (2006.01)
(Continued)

(52) U.S. Cl.
CPC ............ *H04L 61/1511* (2013.01); *H04L 12/14* (2013.01); *H04L 47/10* (2013.01); *H04L 61/2503* (2013.01); *H04L 63/0263* (2013.01);
(Continued)

(58) Field of Classification Search
None
See application file for complete search history.

(56) References Cited

U.S. PATENT DOCUMENTS 5,151,899 A 9/1992 Thomas et al.
5,371,731 A 12/1994 Pratt et al.
(Continued)

FOREIGN PATENT DOCUMENTS

EP 1250022 10/2002
EP 1619917 1/2006
(Continued)

OTHER PUBLICATIONS

U.S. Appl. No. 14/658,633, filed Mar. 16, 2015, entitled "System and Method for Reporting Packet Characteristics in a Network Environment," Inventor(s): Robert Batz et al.
(Continued)

*Primary Examiner* — Faruk Hamza
*Assistant Examiner* — Andrew Oh
(74) *Attorney, Agent, or Firm* — Patent Capital Group

(57) ABSTRACT

A method is provided in one example and includes maintaining a correlation between a domain name and a plurality of Internet protocol (IP) addresses included in a domain name system ("DNS") response to a DNS request in connection with DNS exchange between a subscriber and a DNS server, wherein each of the IP addresses corresponds to one of a plurality of web servers associated with the domain name; receiving from the subscriber a packet associated with a flow; identifying an IP address within the packet as being one of the plurality of IP addresses included in the DNS response; and executing a policy decision for the subsequent flow without inspecting the contents of the subsequent flow at layer 7 based on an identity of the subscriber and the domain name correlated to the identified IP address, wherein the policy decision comprises charging a different rate for a particular flow.

20 Claims, 3 Drawing Sheets

(51) Int. Cl.
*H04L 29/06* (2006.01)
*H04L 12/801* (2013.01)
*H04L 29/08* (2006.01)
*H04L 12/24* (2006.01)

(52) U.S. Cl.
CPC ....... *H04L 29/08288* (2013.01); *H04L 41/0896* (2013.01); *H04L 61/2076* (2013.01); *H04L 61/302* (2013.01); *H04L 61/3025* (2013.01); *H04L 61/6009* (2013.01); *H04L 61/6068* (2013.01); *H04L 63/0892* (2013.01); *H04L 67/1036* (2013.01)

(56) References Cited

U.S. PATENT DOCUMENTS

| | | | |
|---|---|---|---|
| 5,898,713 | A | 4/1999 | Melzer et al. |
| 6,496,516 | B1 | 12/2002 | Dabecki et al. |
| 6,522,880 | B1 | 2/2003 | Verma et al. |
| 6,643,621 | B1 | 11/2003 | Dodrill et al. |
| 6,654,792 | B1 | 11/2003 | Verma et al. |
| 6,684,256 | B1 | 1/2004 | Warrier et al. |
| 6,728,266 | B1 | 4/2004 | Sabry et al. |
| 6,829,242 | B2 | 12/2004 | Davison et al. |
| 6,839,767 | B1 | 1/2005 | Davies et al. |
| 6,862,624 | B2 | 3/2005 | Colby et al. |
| 6,917,592 | B1 | 7/2005 | Ramankutty et al. |
| 6,922,411 | B1 | 7/2005 | Taylor |
| 6,968,389 | B1* | 11/2005 | Menditto .......... H04L 29/12066 709/219 |
| 7,317,693 | B1 | 1/2008 | Roesch et al. |
| 7,366,189 | B2 | 4/2008 | Davison et al. |
| 7,426,202 | B2 | 9/2008 | Warrier et al. |
| 7,447,765 | B2 | 11/2008 | Aerrabotu et al. |
| 7,496,662 | B1 | 2/2009 | Roesch et al. |
| 7,502,836 | B1 | 3/2009 | Menditto et al. |
| 7,522,521 | B2 | 4/2009 | Bettink et al. |
| 7,610,330 | B1 | 10/2009 | Quinn et al. |
| 7,673,072 | B2 | 3/2010 | Boucher et al. |
| 7,742,399 | B2 | 6/2010 | Pun |
| 7,768,983 | B2 | 8/2010 | Nylander et al. |
| 7,792,113 | B1 | 9/2010 | Foschiano et al. |
| 7,808,919 | B2 | 10/2010 | Nadeau et al. |
| 7,827,256 | B2 | 11/2010 | Phillips et al. |
| 7,856,512 | B2 | 12/2010 | Hilla et al. |
| 7,885,248 | B2 | 2/2011 | Harper et al. |
| 7,885,260 | B2 | 2/2011 | Paul et al. |
| 7,890,636 | B2 | 2/2011 | Grayson et al. |
| 7,925,709 | B1 | 4/2011 | Ben-Yoseph et al. |
| 7,926,071 | B2 | 4/2011 | Stephens et al. |
| 7,929,442 | B2 | 4/2011 | Connor et al. |
| 7,984,149 | B1* | 7/2011 | Grayson .......... H04L 65/1063 709/226 |
| 7,990,993 | B1 | 8/2011 | Ghosh et al. |
| 8,018,866 | B1 | 9/2011 | Kasturi et al. |
| 8,086,253 | B1 | 12/2011 | Kalmkar et al. |
| 8,279,776 | B1 | 10/2012 | Everson et al. |
| 8,339,959 | B1 | 12/2012 | Moisand et al. |
| 8,737,221 | B1 | 5/2014 | Jilani et al. |
| 8,743,690 | B1 | 6/2014 | Janarthanan et al. |
| 8,787,303 | B2 | 7/2014 | Leung et al. |
| 8,792,353 | B1 | 7/2014 | Janarthanan et al. |
| 8,792,495 | B1 | 7/2014 | Dixon et al. |
| 8,897,183 | B2 | 11/2014 | Andreasen et al. |
| 8,948,013 | B1 | 2/2015 | Janarthanan et al. |
| 9,003,057 | B2 | 4/2015 | Mahaffey et al. |
| 9,009,293 | B2 | 4/2015 | Batz et al. |
| 9,014,158 | B2 | 4/2015 | Andreasen et al. |
| 9,015,318 | B1 | 4/2015 | Batz et al. |
| 9,030,991 | B2 | 5/2015 | Andreasen et al. |
| 9,031,038 | B2 | 5/2015 | Andreasen et al. |
| 9,049,046 | B2 | 6/2015 | Andreasen et al. |
| 2002/0046264 | A1 | 4/2002 | Dillon et al. |
| 2002/0053029 | A1 | 5/2002 | Nakamura et al. |
| 2003/0028433 | A1 | 2/2003 | Merriman et al. |
| 2003/0028644 | A1 | 2/2003 | Maguire et al. |
| 2003/0039237 | A1 | 2/2003 | Forslow |
| 2003/0058872 | A1 | 3/2003 | Berggreen et al. |
| 2003/0097481 | A1 | 5/2003 | Richter |
| 2004/0015725 | A1* | 1/2004 | Boneh .................. H04L 63/166 713/160 |
| 2004/0054925 | A1 | 3/2004 | Etheridge et al. |
| 2004/0088385 | A1 | 5/2004 | Blanchet et al. |
| 2004/0224678 | A1 | 11/2004 | Dahod et al. |
| 2004/0236855 | A1 | 11/2004 | Peles |
| 2005/0013253 | A1 | 1/2005 | Lindskog et al. |
| 2005/0025152 | A1 | 2/2005 | Georgiou et al. |
| 2005/0058153 | A1 | 3/2005 | Santhoff et al. |
| 2005/0074005 | A1 | 4/2005 | Okuno |
| 2005/0088974 | A1 | 4/2005 | Savoor et al. |
| 2005/0091371 | A1 | 4/2005 | Delegue et al. |
| 2005/0096016 | A1 | 5/2005 | Tervo et al. |
| 2005/0120091 | A1 | 6/2005 | Casais et al. |
| 2005/0147069 | A1 | 7/2005 | Rink et al. |
| 2005/0239473 | A1 | 10/2005 | Pan et al. |
| 2005/0243991 | A1* | 11/2005 | Fijolek .............. H04M 3/42161 379/211.02 |
| 2005/0246346 | A1 | 11/2005 | Gerdes et al. |
| 2005/0286504 | A1 | 12/2005 | Kwon |
| 2006/0015563 | A1* | 1/2006 | Judge .................. G06Q 10/107 709/206 |
| 2006/0018328 | A1 | 1/2006 | Mody et al. |
| 2006/0029084 | A1 | 2/2006 | Grayson |
| 2006/0058021 | A1 | 3/2006 | Fox et al. |
| 2006/0098573 | A1 | 5/2006 | Beer et al. |
| 2006/0164992 | A1 | 7/2006 | Brown et al. |
| 2006/0222086 | A1 | 10/2006 | Frye |
| 2006/0224750 | A1 | 10/2006 | Davies et al. |
| 2006/0234678 | A1 | 10/2006 | Juitt et al. |
| 2006/0256722 | A1 | 11/2006 | Taha et al. |
| 2006/0268901 | A1 | 11/2006 | Choyi et al. |
| 2006/0291388 | A1 | 12/2006 | Amdahl et al. |
| 2007/0014245 | A1 | 1/2007 | Aloni et al. |
| 2007/0027992 | A1* | 2/2007 | Judge .................. G06Q 10/107 709/227 |
| 2007/0067839 | A1 | 3/2007 | Hamada et al. |
| 2007/0078955 | A1 | 4/2007 | Siliquini et al. |
| 2007/0097983 | A1 | 5/2007 | Nylander et al. |
| 2007/0101421 | A1 | 5/2007 | Wesinger et al. |
| 2007/0105568 | A1 | 5/2007 | Nylander et al. |
| 2007/0116019 | A1 | 5/2007 | Cheever et al. |
| 2007/0116020 | A1 | 5/2007 | Cheever et al. |
| 2007/0201369 | A1 | 8/2007 | Pedersen et al. |
| 2007/0201383 | A1 | 8/2007 | Ong et al. |
| 2007/0204063 | A1* | 8/2007 | Banister .............. G06Q 10/107 709/238 |
| 2007/0208820 | A1 | 9/2007 | Makhervaks et al. |
| 2007/0243872 | A1 | 10/2007 | Gallagher et al. |
| 2007/0253328 | A1 | 11/2007 | Harper et al. |
| 2007/0271453 | A1 | 11/2007 | Pohja et al. |
| 2007/0298848 | A1 | 12/2007 | Babin |
| 2008/0010354 | A1 | 1/2008 | Sasaki et al. |
| 2008/0025261 | A1 | 1/2008 | Riley |
| 2008/0026740 | A1 | 1/2008 | Netanel |
| 2008/0045267 | A1 | 2/2008 | Hind et al. |
| 2008/0114862 | A1* | 5/2008 | Moghaddam ..... G06F 17/30899 709/220 |
| 2008/0133518 | A1 | 6/2008 | Kapoor et al. |
| 2008/0137541 | A1 | 6/2008 | Agarwal et al. |
| 2008/0147837 | A1* | 6/2008 | Klein ................ H04L 29/12066 709/223 |
| 2008/0162637 | A1 | 7/2008 | Adamczyk et al. |
| 2008/0176582 | A1 | 7/2008 | Ghai et al. |
| 2008/0177880 | A1 | 7/2008 | Ginis |
| 2008/0188223 | A1 | 8/2008 | Vesterinen et al. |
| 2008/0275748 | A1* | 11/2008 | John ..................... G06Q 30/06 705/35 |
| 2008/0282329 | A1* | 11/2008 | Shuster ............. H04L 29/12066 726/4 |
| 2008/0298309 | A1 | 12/2008 | Dahod et al. |
| 2008/0301254 | A1 | 12/2008 | Bestler |
| 2008/0310404 | A1 | 12/2008 | Valme et al. |
| 2008/0316980 | A1 | 12/2008 | Ahlen et al. |
| 2009/0017864 | A1 | 1/2009 | Keevill et al. |

(56) References Cited

U.S. PATENT DOCUMENTS

| | | |
|---|---|---|
| 2009/0061821 A1 | 3/2009 | Chen et al. |
| 2009/0061873 A1 | 3/2009 | Bao et al. |
| 2009/0067417 A1 | 3/2009 | Kalavade et al. |
| 2009/0086742 A1 | 4/2009 | Ghai et al. |
| 2009/0089447 A1 | 4/2009 | Balachandran et al. |
| 2009/0164597 A1* | 6/2009 | Shuster ............ H04L 29/12066 709/206 |
| 2009/0222583 A1* | 9/2009 | Josefsberg .......... H04L 67/1002 709/245 |
| 2009/0222584 A1* | 9/2009 | Josefsberg ........ H04L 29/12066 709/245 |
| 2009/0254658 A1* | 10/2009 | Kamikura ......... H04L 29/12066 709/225 |
| 2009/0292777 A1* | 11/2009 | Jackson ................ H04L 12/589 709/206 |
| 2010/0082787 A1* | 4/2010 | Kommula .......... H04L 67/1008 709/223 |
| 2010/0131646 A1* | 5/2010 | Drako ............... H04L 29/12066 709/225 |
| 2010/0293296 A1* | 11/2010 | Hsu ..................... H04L 67/1008 709/245 |
| 2011/0122870 A1 | 5/2011 | Dixon et al. |
| 2011/0145111 A1* | 6/2011 | Ljunggren ............. G06Q 20/10 705/30 |
| 2014/0226521 A1 | 8/2014 | Jilani |
| 2014/0233574 A1 | 8/2014 | Dixon et al. |
| 2015/0146719 A1 | 5/2015 | Janarthanan et al. |
| 2015/0172119 A1 | 6/2015 | Mahaffey |
| 2015/0188828 A1 | 7/2015 | Batz et al. |
| 2015/0215810 A1 | 7/2015 | Andreasen et al. |

FOREIGN PATENT DOCUMENTS

| | | |
|---|---|---|
| EP | 1978685 | 10/2008 |
| WO | WO 92/07438 | 4/1992 |
| WO | WO 92/14327 | 8/1992 |
| WO | WO2005/015825 | 2/2005 |
| WO | WO 2009/089455 | 7/2009 |
| WO | WO2009/132700 | 11/2009 |
| WO | WO2011/062745 | 5/2011 |
| WO | WO2011/062746 | 5/2011 |

OTHER PUBLICATIONS

U.S. Appl. No. 12/642,791, filed Dec. 19, 2009, entitled "System and Method for Providing Subscriber Aware Routing in a Network Environment," Inventor(s): Shmuel Shaffer.
U.S. Appl. No. 14/633,572, filed Feb. 27, 2015, entitled "System and Method for Exchanging Information in a Mobile Wireless Network Environment," Inventors: Gary B. Mahaffey, et al.
U.S. Appl. No. 14/611,510, filed Feb. 2, 2015, entitled "Selective Packet Sequence Acceleration in a Network Environment," Inventor(s): Bhagatram Janarthanan et al.
U.S. Appl. No. 14/683,228, filed Apr. 10, 2015, entitled "System and Method for Offloading Data in a Communication System," Inventors: Flemming S. Andreasen, et al.
3GPP TS.23.203 v.11.3.0 Technical Specification—"3rd Generation Partnership Project; Technical Specification Group Services and System Aspects; Policy and Charging control architecture (Release 11)," Sep. 2011; 167 pages.
3GPP TS.23.401 v.10.5.0 Technical Specification—"3rd General Partnership Project; Technical Specification Group Services and System Aspects: General Packet Radio Service (GPRS) enhancements for Evolved Universal Terrestrial Radio Access Network (E-UTRAN) access (Release 10)," Sep. 2011, 284 pages.
PRC Apr. 3, 2014 SIPO First Office Action from Chinese Application No. 201080051408.1.
PRC Dec. 12, 2014 SIPO Second Office Action from Chinese Application No. 201080051408.1.
PRC Jun. 25, 2015 SIPO Third Office Action from Chinese Application No. 201080051408.1.

\* cited by examiner

US 9,210,122 B2

SYSTEM AND METHOD FOR INSPECTING DOMAIN NAME SYSTEM FLOWS IN A NETWORK ENVIRONMENT

RELATED APPLICATION

This Application is a continuation (and claims the benefit of priority under 35 U.S.C. §120) of U.S. application Ser. No. 12/621,114, filed Nov. 18, 2009, entitled "SYSTEM AND METHOD FOR INSPECTING DOMAIN NAME SYSTEM FLOWS IN A NETWORK ENVIRONMENT," Inventors Robert Batz, et al. The disclosure of the prior application is considered part of (and is incorporated in its entirety by reference in) the disclosure of this application.

TECHNICAL FIELD

This disclosure relates in general to the field of communications and, more particularly, to inspecting domain name system flows in a network environment.

BACKGROUND

Networking architectures have grown increasingly complex in communication environments. As the subscriber base of end users increases and/or becomes mobile, proper routing and efficient management of communication sessions and data flows becomes critical. Typically, subscribers seek to access content from various locations in the network. Subscribers may be provided connectivity or services based on some type of policy or agreement that involves a service provider. The service provider relationship commonly dictates the terms under which subscribers operate in the network. The ability to properly manage policies and to effectively route traffic for the subscriber presents a significant challenge to system designers, component manufacturers, network operators, and system administrators.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

A method is provided in one example and includes maintaining a correlation between a domain name and a plurality of Internet protocol (IP) addresses included in a domain name system ("DNS") response to a DNS request in connection with DNS exchange between a subscriber and a DNS server, wherein each of the IP addresses corresponds to one of a plurality of web servers associated with the domain name; receiving from the subscriber a packet associated with a flow; identifying an IP address within the packet as being one of the plurality of IP addresses included in the DNS response; and executing a policy decision for the subsequent flow without inspecting the contents of the subsequent flow at layer 7 based on an identity of the subscriber and the domain name correlated to the identified IP address, wherein the policy decision comprises charging a different rate for a particular flow.

Example Embodiments

Figure 1:
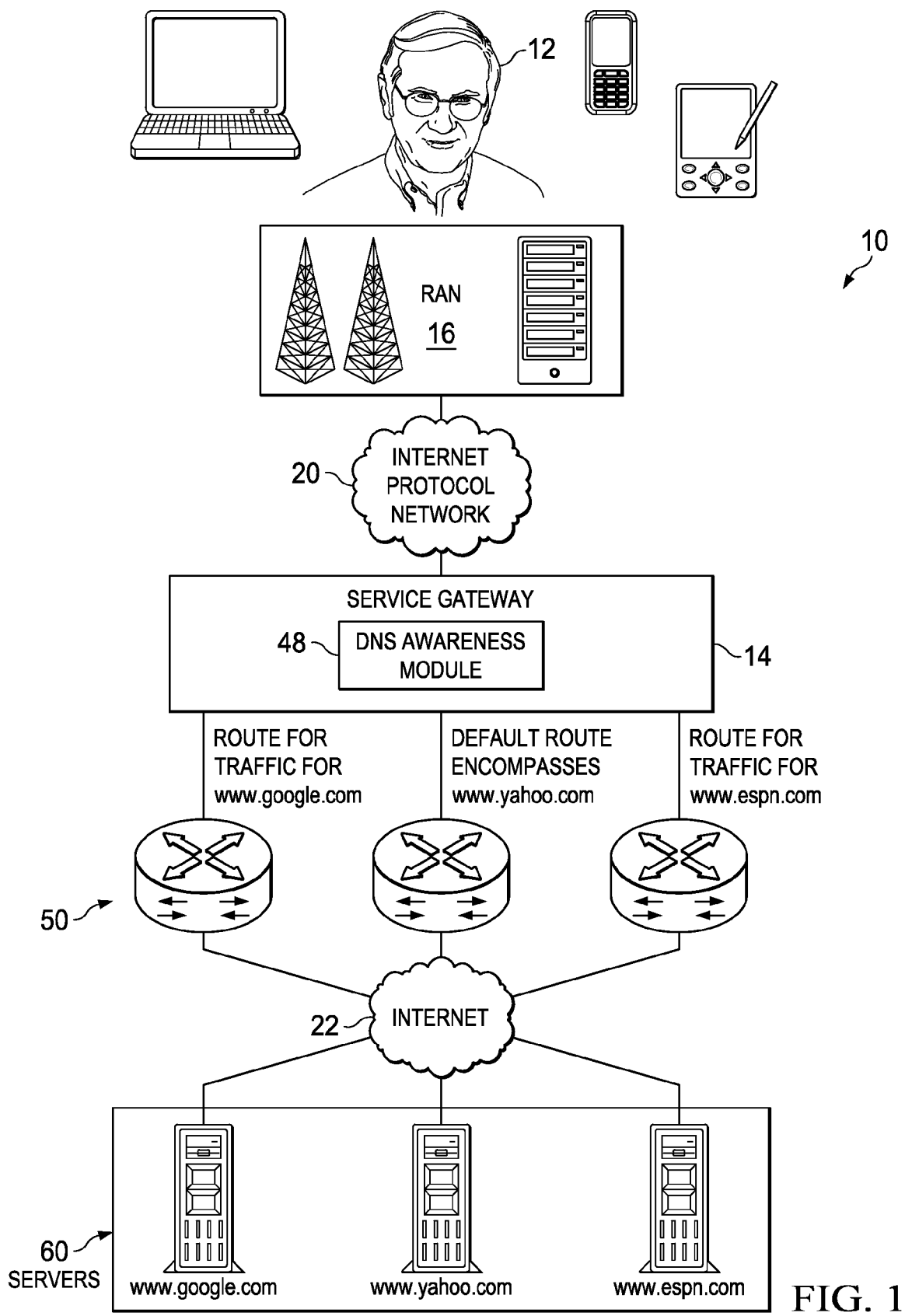
FIG. 1 is a simplified block diagram of a communication system for inspecting domain name system flows in a network environment in accordance with one embodiment of the present disclosure.

Turning to FIG. 1, FIG. 1 is a simplified block diagram of a communication system 10 for inspecting domain name system flows in a network environment. FIG. 1 may include a subscriber 12, a service gateway 14, a radio access network (RAN) 16, and an Internet protocol (IP) network 20. Service gateway 14 may include a domain name system (DNS) awareness module 48. Additionally, communication system 10 may include multiple inline service nodes (ISNs) 50, which have a logical connection to an Internet 22. In this particular instance, each ISN 50 is part of respective network paths directed toward multiple servers 60. In this particular example, servers 60 include web servers relegated for traffic destined for various hostnames (e.g., having various uniform resource locators (URLs)) including Google.com, Yahoo.com, and ESPN.com.

Communication system 10 may include a configuration capable of transmission control protocol/internet protocol (TCP/IP) communications for the transmission and/or reception of packets in a network. Communication system 10 may also operate in conjunction with a user datagram protocol/IP (UDP/IP) or any other suitable protocol where appropriate and based on particular needs. Communication system 10 may be generally configured or arranged to represent a 2G, a 2.5G, or a 3G communication architecture applicable to a Global System for Mobile (GSM) environment in accordance with a particular embodiment of the present disclosure. Communication system 10 may also be configured to operate with any version of any suitable GPRS tunneling protocol.

For purposes of illustrating certain example techniques of communication system 10, it is important to understand the communications that may be traversing the network at a given time interval. The following foundational information may be viewed as a basis from which the present disclosure may be properly explained. Service providers maintain substantial networking infrastructure through which mobile data traverses. Examples of such infrastructure can include image compression, content optimization, wireless application protocol (WAP) gateways, content filtering, etc. Architectures typically route traffic inefficiently to all available service nodes. Certain network appliances perform DNS inspection for billing, or for data mining purposes, but these techniques fail to offer an intelligent awareness for particular flows propagating through a given network element.

Communication system 10 can resolve these issues (and others) by employing a network element (e.g., service gateway 14) that includes awareness intelligence. In one example implementation, service gateway 14 can leverage its awareness of the content of DNS flows to utilize mappings that correlate IP addresses to matching hostnames (e.g., on a global basis, on a group basis, on a per-subscriber basis, etc.). This knowledge can be used to perform policy routing (e.g., at L7) on subsequent flows. This can be executed globally, or per-subscriber, as the network element receives the first packet of the subsequent flow (in contrast to executing a policy decision after packets of the subsequent flow have already passed through the network element). Additionally, the intelligence within service gateway 14 can independently allow for billing of such flows based on the collected information. This could occur regardless of whether policy-based routing occurred for the particular flows.

In operation of an example flow, service gateway 14 is configured to monitor DNS exchanges (where a DNS exchange can include a DNS query and a corresponding DNS response). While monitoring the DNS exchanges, service gateway 14 is configured to extract hostname information to be compared against the policies and the records for the IP addresses in the responses. In one instance, service gateway 14 is configured to record the routing domain in which the DNS query took place. Using the extracted data, service gateway 14 is configured to construct records of IP addresses and the policies that were matched. Using these records, service gateway 14 surveys and examines flows that have a recorded IP address as an endpoint. When a session starts that includes such an endpoint, service gateway 14 can use the maintained records (i.e., the correlations) to make a routing decision (e.g., a "next-hop" routing decision) for the session being initiated. This decision can be the result of matches for all (or any subset of) the subscriber specific policies, the global policies, etc. These policies may be associated with a hostname policy that was recorded, the L4 coordinates of the new session, the identity of the subscriber, the state of the subscriber record, etc. In one general sense, a DNS flow is effectively established by the time service gateway 14 evaluates a packet to identify the IP address for mapping activities. The packet can be associated with one of many possible additional flows, which the client initiates in order to obtain content (i.e., not simply an IP address mapping). In one instance, there can be one DNS flow followed by one or more flows to the address that was the subject of the DNS query. For each such subsequent flow, service gateway 14 can perform the receiving, identifying, and executing sequence, as detailed herein.

As a result of some of these activities, a new session for a given subscriber's traffic (which is passing through service gateway 14) can be routed and/or billed based on layer 7 information, which would not normally be available in the routed flow, or not available until after it was too late to make an L7 routing decision. Normally, routes for a session can be chosen at any time during the session. For the types of network deployments where service gateway 14 would operate, this becomes impractical because one route might encounter a full L4 proxy for TCP streams, while another route might access the origin server directly. Other cases where it would be unacceptable to reroute a flow midstream could involve service nodes, where flow-specific states are maintained even without proxying the TCP session.

Note that billing decisions based on the destination domain normally depend on the ability of a billing network element to be able to parse the protocol being billed to a level in which the data in the protocol (e.g., a host header in HTTP) becomes visible. For many protocols, this data is not visible because the addressed endpoint intuitively understands its own domain, or alternatively because the billing element cannot parse the protocol. Other L7 routing solutions experience challenges because the flow to be routed does not contain useful information at L7. This information can be used by the network element (e.g., service gateway 14) to make a routing decision. Other challenges lie in the deployment environment in which it becomes difficult to change the routing for a session once sufficient L7 information has been accumulated. It can be impractical because upstream nodes often manipulate the flows in unrecoverable ways (e.g., via proxy operations). These same upstream nodes are also typically configured to maintain state information about the flows in such a way that rerouting the flow can disrupt a service for subscriber 12.

Communication system 10 can be provided in the context of a billing solution: allowing flows that could not be parsed to be billed based on the destination domain. In many cases, this cannot be achieved simply with access control lists (ACLs) because origin hosts are often deployed across a constantly changing (dynamic) set of IP addresses. This constant change is a result of resources becoming available, or expiring, which can be part of a form of crude regional load balancing accomplished via DNS. In one general sense, rather than using a literal ACL to make a policy decision, service gateway 14 can use a data element, which matches traffic based on an IP address associated with a domain name via DNS parsing. This saves an operator from having to update ACLs for web sites, where the set of IP addresses being used changes over time, or is unknown a priori.

Typically, content providers constantly add servers and occasionally decommission servers as they upgrade their services. In many of these environments, DNS load balancing is employed, which further complicates the issue. Thus, static provisioning of IP addresses for these sites is operationally expensive, and difficult to execute in practice. Communication system 10 can overcome these difficulties in providing an inexpensive and efficient (e.g., operationally and computationally) mechanism to differentiate between traffic flows to one domain versus flows intended for another domain. Communication system 10 can also allow service gateway 14 to bill multiple flows without incurring the overhead of excessive parsing activities because the data segment to be used for billing purposes could be as simple as the destination domain name. Such an optimization could increase network performance by reducing the parsing load. Before turning to some of these potential operations, a brief discussion is provided about the infrastructure of FIGS. 1-2.

Figure 2:
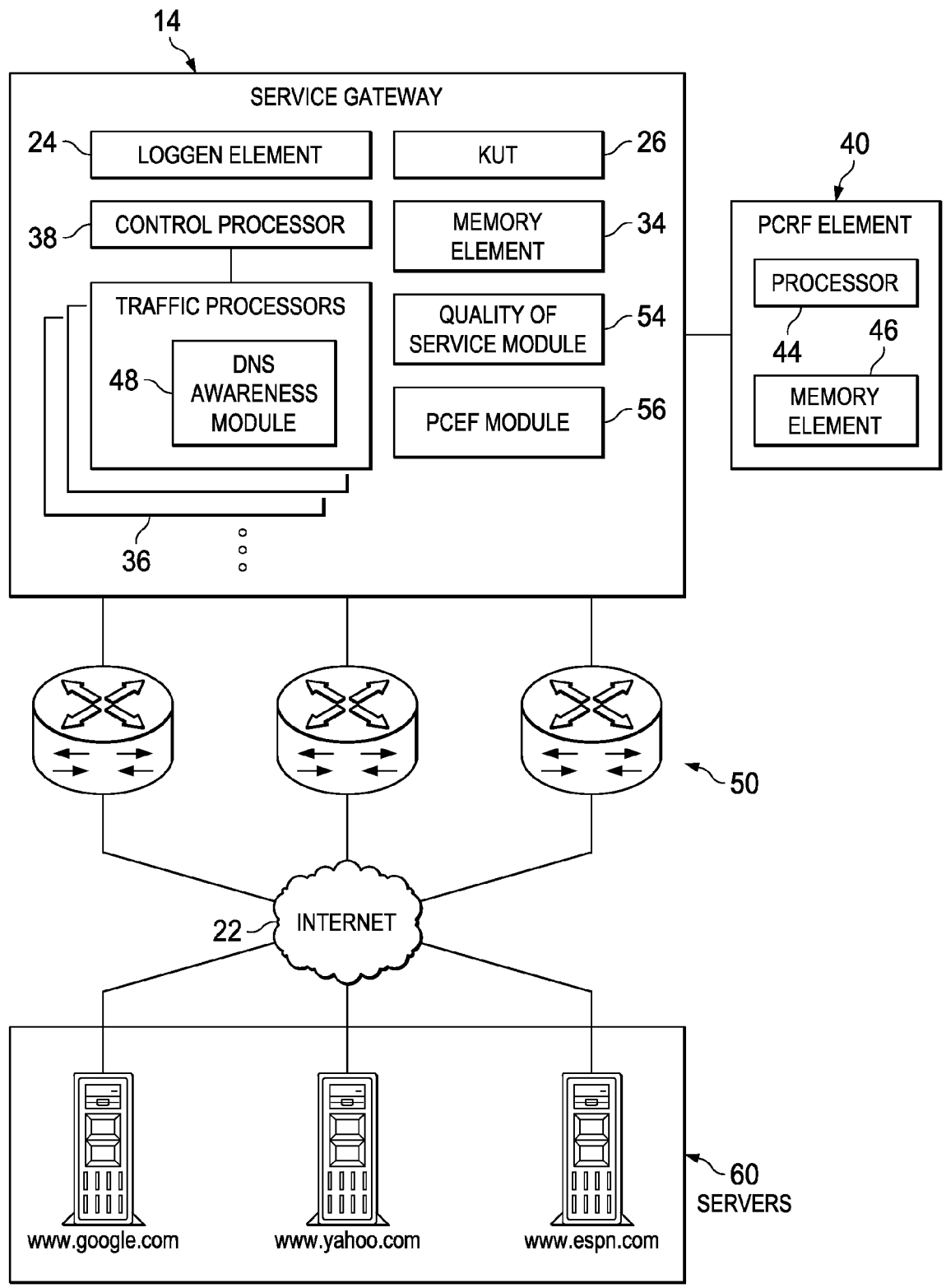
FIG. 2 is a simplified block diagram illustrating one potential configuration associated with the communication system.

FIG. 2 is a simplified block diagram illustrating additional details associated with service gateway 14. In one example implementation, service gateway 14 may include a loggen element 24, a known user table (KUT) 26, and multiple traffic processors 36, which have a logical connection to a control processor 38. Service gateway 14 may additionally include a quality of service (QoS) module 54, a policy control enforcement function (PCEF) module 56, and a memory element 34. Communication system 10 may also include a policy and charging rules function (PCRF) element 40, which includes a processor 44, and a memory element 46. This particular implementation includes servers 60, which may include content or services sought by subscriber 12.

Subscriber 12 can be associated with clients, customers, or end users wishing to initiate a communication in communication system 10 via some network. The term 'subscriber' is inclusive of devices used to initiate a communication, such as a computer, a personal digital assistant (PDA), a laptop or electronic notebook, a cellular telephone, an iPhone, an IP phone, or any other device, component, element, or object capable of initiating voice, audio, video, media, or data exchanges within communication system 10. Subscriber 12 may also be inclusive of a suitable interface to the human user, such as a microphone, a display, or a keyboard or other terminal equipment. Subscriber 12 may also be any device that seeks to initiate a communication on behalf of another entity or element, such as a program, a database, or any other component, device, element, or object capable of initiating an exchange within communication system 10. Data, as used herein in this document, refers to any type of numeric, voice, video, media, or script data, or any type of source or object code, or any other suitable information in any appropriate format that may be communicated from one point to another.

Service gateway 14 and PCRF element 40 are network elements that facilitate service flows between endpoints and a given network (e.g., for networks such as those illustrated in FIGS. 1-2). As used herein in this Specification, the term 'network element' is meant to encompass routers, switches, gateways, bridges, loadbalancers, firewalls, servers, inline service nodes, proxies, processors, modules, or any other suitable device, component, element, or object operable to exchange information in a network environment. The network elements may include DNS awareness module 48 to support (or otherwise execute) the activities associated with inspecting DNS flows, as outlined herein. Moreover, the network elements may include any suitable hardware, software, components, modules, interfaces, or objects that facilitate the operations thereof. This may be inclusive of appropriate algorithms and communication protocols that allow for the effective exchange of data or information.

In one implementation, service gateway 14 includes software to achieve (or to foster) the inspection and mapping operations, as outlined herein in this document. Note that in one example, these network elements can have an internal structure (e.g., with a processor, a memory element, etc.) to facilitate some of the operations described herein. In other embodiments, all of these inspection and mapping features may be provided externally to these elements or included in some other network device to achieve this intended functionality. Alternatively, service gateway 14 includes this software (or reciprocating software) that can coordinate with other elements in order to achieve the operations, as outlined herein. In still other embodiments, one or both of these devices may include any suitable algorithms, hardware, software, components, modules, interfaces, or objects that facilitate the operations thereof.

In one example implementation, service gateway 14 can interface with multiple serving general packet radio service (GPRS) support nodes (SGSNs) and multiple gateway GPRS support nodes (GGSNs) to serve a plurality of subscribers 12. In certain networks, service gateway 14 can act as a PCEF, either as part of an enhanced GGSN (eGGSN) node, where service gateway 14 and a GGSN are provided as separate cards in a given network element. Alternatively, service gateway 14 can be configured to operate as a standalone node, with interoperability from external GGSNs. Service gateway 14 and a given GGSN can communicate with each other using a remote authentication dial in user service (RADIUS) protocol, or any other suitable protocol where appropriate. Other protocols to be used in such communications can include Diameter, service gateway interface (SGI), terminal access controller access-control system (TACACS), TACACS+, etc.

Service gateway 14 can support a GPRS tunneling protocol (GTP), any packet data protocol (PDP) authentication, authorization, and accounting (AAA) operations, QoS, RAN signaling, etc. GPRS may support multiple internet communication protocols and may enable existing IP, point-to-point protocol (PPP), or any other suitable applications or platforms to operate over a given network. Service gateway 14 can offer billing, charging, profile management, QoS management, etc. with per-user L7 rules and per-user service policies. The user profile can define the actions that service gateway 14 can take for one or more subscribers 12. In addition, the user profile can define the mobile policy control and charging (MPCC) profile to be used by service gateway 14 when sending per-user credit control requests (CCRs) to PCRF element 40.

RAN 16 is a communication interface between subscriber 12 and IP network 20. RAN 16 may comprise a base transceiver station and a base station controller in one embodiment. The communication interface provided by RAN 16 may allow data to be exchanged between subscriber 12 and any number of selected elements within communication system 10. RAN 16 may facilitate the delivery of a request packet generated by subscriber 12 and the reception of information sought by subscriber 12. RAN 16 is only one example of a communication interface between subscriber 12 and service gateway 14. Other suitable types of communication interfaces may be used for any appropriate network design and these may be based on specific communication architectures.

IP network 20 represents a series of points or nodes of interconnected communication paths for receiving and transmitting packets of information that propagate through communication system 10. IP network 20 offers a communicative interface between subscriber 12 and service gateway 14, and may be any local area network (LAN), Intranet, extranet, wireless local area network (WLAN), metropolitan area network (MAN), wide area network (WAN), virtual private network (VPN), or any other appropriate architecture or system that facilitates communications in a network environment. IP network 20 may implement a UDP/IP connection and use a TCP/IP communication protocol in particular embodiments of the present disclosure. However, IP network 20 may alternatively implement any other suitable communication protocol for transmitting and receiving data packets within communication system 10. Internet 22 offers a communicative interface between servers 60 and ISNs 50. Internet 22 may foster any communications involving services, content, video, voice, or data more generally, as it is exchanged between subscriber 12 and various network elements.

PCRF element 40 can be configured to act as a Diameter server and perform the following functions: 1) provision mobile policy control and charging (MPCC) rules to (and remove MPCC rules from) PCEF module 56; 2) manage policy control decisions; 3) provide network control regarding the service data flow detection, QoS, and flow-based charging towards PCEF module 56; 4) receive session and media-related information from application functions (AFs); and 5) inform the AFs of traffic plane events.

PCEF module 56 can act as a Diameter client and perform the following functions: 1) use a suitable interface to send traffic plane events to PCRF element 40; 2) enforce policy, handle flow-based charging, control QoS and the handling of user plane traffic; 3) provide service data flow detection, accounting for online and offline charging interactions; and 4) report changes in the status of service data flows. The PCC rules can be used to: 1) detect a packet that belongs to a service data flow; 2) identify the service to which the service data flow contributes; and 3) provide applicable charging parameters and policy control for a service data flow. PCC rules can be dynamically provisioned by PCRF element 40 to PCEF module 56 over a suitable interface. Dynamic PCC rules can be dynamically generated in PCRF element 40. Dynamic PCC rules can be activated, modified, and deactivated at any time.

Loggen element 24 is a storage element operable to build billing records and communicate the billing records to a billing system based on information provided by KUT 26. Loggen element 24 may also operate to store data for later use and execute all formatting for billing records to be communicated to a billing system. Loggen element 24 may be implemented using hardware, software, or any other suitable element or object operable to store information and to generate a billing record to be communicated to a billing system.

Loggen element 24 may generate logging records or billing records and additionally send messages to a billing system element associated with a change in SGSN.

KUT 26 is a data storage element that manages one or more correlations between the ID of subscriber 12 and a corresponding IP address. KUT 26 could be simply part of any memory element within service gateway 14. KUT 26 may also store information relating to billing, previously designated for subscriber 12, and the billing system may be invoked when additional information associated with subscriber 12 is communicated to service gateway 14. KUT 26 may be consulted as additional billing records are created in order to determine that a billing system should receive selected billing records. KUT 26 may also include an application program interface (API) that may be implemented in order to obtain user ID information for an IP address from a data flow.

KUT 26 is provided with the capability of mapping the source IP address (or any other subscriber 12 parameter) to a user ID. The user ID may be obtained from an external database, where appropriate, or any other suitable location. Alternatively, the user ID may be extracted from a RADIUS flow, a TACACS communication flow, a Diameter communication flow, or any other suitable communication protocol flow, communication session, or data exchange. The database may be populated at any suitable time and updated using any suitable mechanism, such as via the sniffing of RADIUS or TACACS flows.

In one example implementation, each traffic processor 36 keeps a copy of the DNS elements that have passed through it. In one instance, within the same particular network blade, different traffic processors can maintain different DNS entry correlations. For example, one traffic processor may include various DNS entries for Google.com, whereas another traffic processor may include various DNS entries for Yahoo.com. The particular rules for making policy decisions for particular subscribers, IP addresses, etc. may be somewhat distributed. In one example implementation, there is a local cache of rules on one or more of traffic processors 36. Any of this information can be stored in one or more tables that can be included in memory element 34, or stored along with traffic processors 36, control processor 38, KUT 26, etc. This stored information can include mappings between subscriber identities, IP addresses, policies, etc., where this information can be correlated and cross-referenced for purposes of applying particular rules within a policy. Note that the mapping information can be dynamic, which can offer valuable savings for an Internet service provider (ISP). In addition, such dynamic information can be used for load balancing purposes, or it can minimize significant overhead typically experienced in many of these subscriber scenarios.

Inline service nodes (ISNs) 50 represent different types of network devices (e.g., routers, switches, gateways, etc.) that can offer various services and capabilities for subscriber 12. Thus, particular ISNs can offer different services for incoming flows. For example, one ISN may be associated with video compression such that any flow associated with this particular technology or protocol would be routed to that ISN. Another ISN may be tasked with content filtering operations, while still another ISN may be associated with voice data associated with a VPN connection. Thus, in changing the path for a particular communication flow, the packets can be processed or implicated differently depending on which ISN is processing the particular flow. In one example, there is a default route associated with particular web servers, and this particular default could be the shortest path between two network points. In another example, DNS awareness module 48 can inform particular routing decisions such that particular flows are directed to specific paths that can accommodate specific subscriber needs. In one example, ISNs 50 may not be simple routers in a more traditional sense. ISNs 50 could be more complex service nodes operating on network flows at much higher levels, rather than providing simple routing and forwarding operations. For example, these nodes may implement specialized inline services such as image and video optimization, wireless TCP optimizations, protocol transformations (WAP/HTTP), content filtering controls, etc.

Servers 60 can be a web server offering content or services to any subscriber or any group of subscribers. For example, servers 60 could be any network element associated with www.ESPN.com or www.yahoo.com: both of which could offer content for their end users. Alternatively, servers 60 can be any destination, location, or node that is sought to be accessed or used by subscriber 12. Servers 60 may provide the requested service/content, or provide a portal, pathway, or gateway to another location that includes the desired data. In other embodiments, servers 60 could simply be a data storage location or a processor that can store or deliver content or services to one or more subscribers 12.

In operation of an example flow, a service provider may seek to make decisions about traffic flows without having to inspect the contents of each individual traffic flow at layer 7. Those decisions may depend on the direction of the traffic flows (e.g., the destination domain, a particular web server, etc.). The challenge in executing this decision is that a numeric address (i.e., the IP address) is universally used to make routing decisions. The IP addresses that are used in this example are constantly changing. In certain cases, these changes may occur daily, where different and new IP addresses are systematically assigned. This creates a difficult dilemma for network operators that seek to route flows in a certain way for particular servers. In essence, the identification of those servers (i.e., their IP addresses) is arbitrary and unpredictable.

These issues may be resolved by service gateway 14 monitoring DNS requests and maintaining a cache record of the acceptable IP addresses that were assigned to a domain name. This monitoring and maintaining activity initially occurred as the user's particular flow propagated through a given network element (e.g., service gateway 14). The cache of acceptable IP addresses can be looked up in an appropriate table to map the numerical representation to a given entity. For example, by evaluating an acceptable IP address in a cache record, the service provider can identify an appropriate IP address associated with www.google.com.

In one example implementation, the extracted data includes any one of the following items: 1) domain name; 2) a set of IP addresses; and 3) a time to live value for those IP addresses from the DNS flow. Service gateway 14 may be configured to retain all of this information in the form of a lookup table (e.g., keyed by IP address). Note that as used herein in this Specification, the term "correlation" is meant to connote any relationship or association between two or more data segments. This could involve a subscriber's identity, a domain name, an IP address, a policy associated with a subscriber, a QoS metric, etc. In addition, the term "maintain" is meant to connote any type of acknowledgment, caching, examination, evaluation, survey, recording, storage, accumulation, cataloging, or identification by service gateway 14 of a particular data segment propagating in the network. This maintaining activity can be temporary, provided over a limited time (e.g., some fixed time interval, cached, etc.), or more permanent, where suitable updating activities could systematically occur.

In one example operation, an operator provisions sets of domain names into domain groups. Policies can specify rules for routing, charging, and control based on the domain group, which can match to a new flow. This matching can also be affected by an intelligent association relating to user attributes such as a type of the endpoint, subscriber account characteristics, etc. Note that service gateway 14 has the intelligence to also use endpoint information as an input to policy selection, for example, along with domain group information. In one example, service gateway 14 can learn and/or use endpoint characteristics and other information yielded from various policy engines, from RADIUS flows, etc. to make intelligent policy decisions.

The service provider can make any number of decisions based on this identification of acceptable IP addresses for a particular web server. For example, the service provider may provide some benefit to the particular subscriber associated with this flow based on a partnership between service provider and the destination web server entity. In another example, a service provider could limit the amount of traffic to a particular web server due to congestion concerns in the network. In still other examples, the service provider could manage charging for this particular subscriber based on some preexisting policy that implicates the particular web server (or hostname) being accessed. In still other examples, quality of service management functions could be provided based on an identified IP address.

Note that such decisions could theoretically be made by opening individual flows and, further, making some type of logical connection between the contents of the flow and its particular destination. However, this intensive parsing creates additional processing overhead, as each individual flow is inspected thoroughly before rendering certain policy decisions. Moreover, such inspection activities can disrupt the flows, or cause flows to become disconnected based on the intrusion. In contrast to these operations, embodiments of communication system 10 can simply identify an appropriate entity (e.g., a web server) based on a cache record of correlated IP addresses. In particular embodiments, a DNS sniffing activity can be performed as a flow is initiated by subscriber 12. The initial IP address included in the subscriber flow can be used to glean information associated with a particular web server sought to be accessed. Thus, initial packets can be used to make a subsequent determination about an acceptable IP address associated with a particular entity.

Consider an example involving subscriber 12, who is operating a laptop computer that has been turned off for the last two days. IP addresses stored in the laptop's browser commonly include a time to live (TTL) parameter such that, based on this particular timeframe of two days, the laptop would not rely on these IP addresses as being viable. In this particular example, the TTLs have expired and subscriber 12 types in the following URL: http://www yahoo.com. The browser within the laptop can access a piece of software (e.g., a resolver) within the laptop to resolve URLs to particular IP addresses. The resolver can construct a DNS query, where the query would be sent to a configured location (e.g., a DNS server) that is often predetermined by the service provider. In a general sense, the query is asking the DNS server for an appropriate IP address associated with this particular URL. The DNS server can respond to this query by providing several different IP addresses for accessing this particular website. Included within these IP addresses would be a TTL parameter that outlines the length of time for which the particular IP address is valid (i.e., an appropriate expiration time.). The resolver within the operating system of the laptop can communicate the acceptable IP addresses to the browser.

In one particular example, this initial flow being established by subscriber 12 is acknowledged (or otherwise noticed) by service gateway 14. More particularly, this particular flow can be noticed by DNS awareness module 48. In more specific embodiments, the flow is noticed via port 53, which is the DNS port capable of facilitating flows involving UDP, TCP, etc. Service gateway 14 is configured to parse both the request and the response for this particular flow in order to store/maintain the correlation between the IP address and the domain name. Thus, service gateway 14 can remember the domain name being implicated and, furthermore, it can remember, record, or otherwise maintain this information in a useful manner.

The domain name data segment may be grouped in any appropriate manner, or simply placed in some type of cache for subsequent reference. Note that placing this domain name data segment in a group has value because often times a particular URL address has various canonical and generic forms. Thus, there could be various textual forms for particular URLs. Hence, for the grouping mechanism, the logical grouping could include any permutations associated with the particular website. For example, certain websites provide slightly different URLs for mobile users, for subscribers, for visitors, etc. Thus, the particular URL could vary by several letters (from a more generic URL) based on a given business entity, which has configured ancillary servers to accommodate particular communication flows. Note also that the organization of these particular IP addresses may be stored along with their associated TTLs, which offer a time period for which the IP addresses are valid.

At this point in the flow, the browser understands that it can use these valid IP addresses to initiate a request to be directed at a particular server. For example, a browser can take this information and construct an HTTP request (e.g., on port 80) to initiate a TCP connection toward the target destination. As the SYN packet flows through service gateway 14, it is noticed and, further, this particular packet is mapped to some type of DNS awareness activity for this particular subscriber. Having made this connection to a particular subscriber, a rule set can be evaluated to analyze what type of DNS awareness activity should be applied to this particular flow. In addition, the actual IP address for the HTTP flow and a reverse lookup can be conducted. For example, a particular IP address can be used in order to identify that this particular IP address is associated with a group of domains associated with www.yahoo.com. At this point, the architecture has identified subscriber 12 and the particular domain to which he is attempting to connect. The architecture has a set of rules that can be applied for this particular instance.

The response mechanism at this junction could include any number of activities such as: redirecting the flow to an alternative destination (e.g., for authorizing additional billing, for granting permissions to access particular content, for certifying their age, etc.), interrupting the flow, disconnecting the flow, changing the route amongst ISNs 50 for this particular flow, applying rate limiting operations for the flow, disconnecting the flow, filtering the flow, billing for the flow, denying the flow access to the particular web server (e.g., in an adult content scenario), applying a quality of service level, charging a different rate for this particular flow, etc. Many of these responses may be executed by service gateway 14 and/or by PCEF module 56, which can be configured to perform some or all of the responses identified above.

Thus, once a particular piece of data is identified through DNS sniffing, any number of suitable responses can occur. For example, based on an identification of the domain name, service gateway 14 may choose to stop services for this particular subscriber. In other instances, service gateway 14 could block particular traffic for this subscriber. Other responses could include a continual monitoring or policing for this particular subscriber. Another response could include adjusting, terminating, or otherwise managing a quality of service level for the subscriber's flow(s). Yet another response could include indicating to a corresponding GGSN to terminate/drop this subscriber connection.

Figure 3:
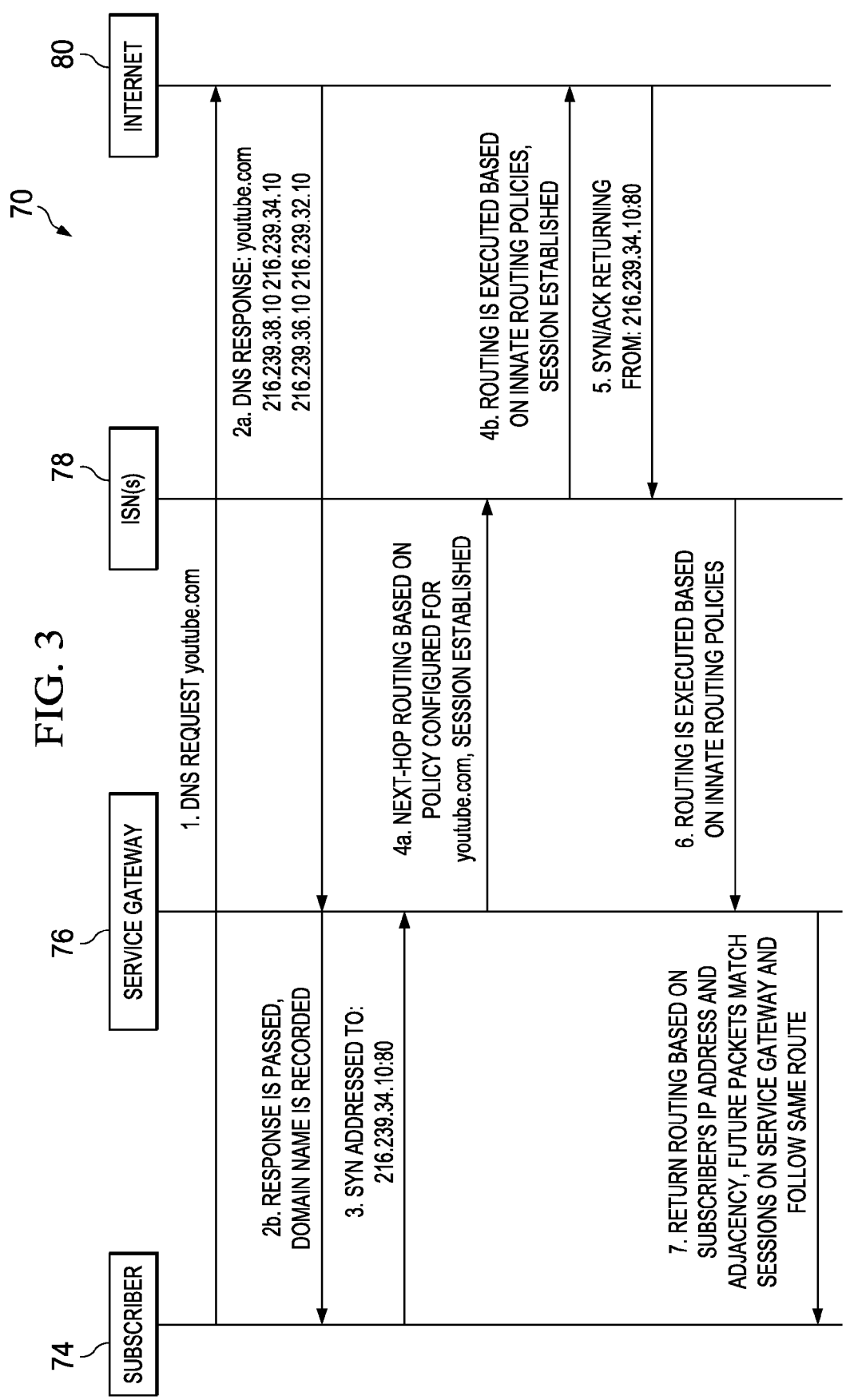
FIG. 3 is a simplified flow diagram illustrating example operations associated with the communication system.

FIG. 3 is a simplified flow diagram 70, which illustrates an example interaction associated with DNS awareness activity. This particular example involves a given subscriber 74, service gateway 76, one or more ISNs 78, and an Internet 80. (Note that service gateway 76 has the capability to behave in a manner similar to that described above with respect to service gateway 14.) At step 1, subscriber 74 initiates a DNS request (e.g., for www.YouTube.com) and this request flows through service gateway 76 and is directed to Internet 80. Note that behind Internet 80 are multiple servers, which can service the particular flows for the subscribers (e.g., provide requested content, perform a service, deliver data, etc.).

In response to a DNS request at step 2a, a DNS response is sent back through the network. In this particular example, a group of valid IP addresses is sent back toward subscriber 74. Note that the group of returned IP addresses can include a TTL associated with each IP address. At step 2b, the DNS response is parsed by service gateway 76 (e.g., via DNS awareness module 48) and the domain name is recorded. In addition, particular IP addresses can be mapped to specific policies at step 2b.

At step 3, subscriber 74 can make a request to the IP address just obtained. This could involve, for example, retrieving a video from this particular website. A SYN packet flows initially (e.g., over port 80) as shown, and this request can be received by service gateway 76. At step 4a, service gateway 76 can access knowledge that it has maintained for particular IP addresses in order to manipulate this flow in some manner. More specifically, service gateway 76 can use IP address 216.239.34.10 to map to the domain youtube.com for the purpose of accessing a routing policy for this particular domain. Service gateway 76 has the intelligence to recognize this particular IP address as being associated with previous DNS sniffing activity. For this particular example, service gateway 76 makes the logical connection between YouTube.com, a particular IP address propagating through service gateway 76, and one or more policy rules that dictate how this flow is to be processed. The processing for this particular IP address can include billing, QoS policies, routing policies, etc. and all of this can be applied at this particular instance.

At this juncture, the session is established for subscriber 74, where the SYN packet is forwarded to the correct next-hop destination in the network. Note that step 4a represents a routing decision, but various other decisions can be implemented at this stage. For example, an accounting or policy decision may be implemented at this juncture, which can include QoS activities, online/offline charging, filtering, etc. Note that this policy decision can include routing a particular flow through an intermediate device, which can provide enhanced services. For example, this intermediate device may apply more stringent, or granular filtering for particular flows. Alternatively, this intermediate device may provide a certification of a subscriber's identity, or offer enhanced video processing, etc.

ISN 78 can receive packets from service gateway 76 and subsequently make a routing decision based on their innate (e.g., ordinary) routing policies. In one sense, the particular ISN 78 of the group can be selected based on the policy configured in service gateway 76. ISNs 78 can be configured to route to a given destination IP address (e.g., "dst") according to their customary routing policies. In step 4, the dst is Internet 80 for step 4b, while in step 6, the dst is service gateway 76.

At step 5, a SYN/ACK packet is sent by the origin server, and this propagates through Internet 80 to ISN 78. As shown in step 6, ISN 78 directs packets to service gateway 76. At step 7, service gateway 76 provides a return routing path based on the subscriber's IP address and adjacency, where future packets match sessions on service gateway 76 and, therefore, could follow the same route. Note that these particular metrics of this specific example (i.e., the subscriber's IP address and adjacency) represent one of many possible characteristics that can be used in making an intelligent routing decision. One example implementation involves subscriber-aware routing and domain-aware routing being executed for particular flows.

Note that in certain example implementations, the inspection and mapping functions outlined herein may be implemented by logic encoded in one or more tangible media (e.g., embedded logic provided in an application specific integrated circuit [ASIC], digital signal processor [DSP] instructions, software [potentially inclusive of object code and source code] to be executed by a processor, or other similar machine, etc.). In some of these instances, a memory element [as shown in FIG. 2] can store data used for the operations described herein. This includes the memory element being able to store software, logic, code, or processor instructions that are executed to carry out the activities described in this Specification. A processor can execute any type of instructions associated with the data to achieve the operations detailed herein in this Specification. In one example, the processor [as shown in FIG. 2] could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array [FPGA], an erasable programmable read only memory (EPROM), an electrically erasable programmable ROM (EEPROM)) or an ASIC that includes digital logic, software, code, electronic instructions, or any suitable combination thereof.

In one example implementation, service gateway 14 includes software in order to achieve the inspection and mapping functions outlined herein. These activities can be facilitated by DNS awareness module 48. Service gateway 14 can include memory elements for storing information to be used in achieving the intelligent inspection and mapping operations, as outlined herein. Additionally, each of these devices may include a processor that can execute software or an algorithm to perform the inspection and mapping activities, as discussed in this Specification. These devices may further keep information in any suitable memory element [random access memory (RAM), ROM, EPROM, EEPROM, ASIC, etc.], software, hardware, or in any other suitable component, device, element, or object where appropriate and based on particular needs. Any of the memory items discussed herein (e.g., database, table, cache, key, etc.) should be construed as being encompassed within the broad term 'memory element.' Similarly, any of the potential processing elements, modules, and machines described in this Specification should be construed as being encompassed within the broad term 'processor.' Each of the network elements can also include suitable interfaces for receiving, transmitting, and/or otherwise communicating data or information in a network environment.

Note that with the example provided above, as well as numerous other examples provided herein, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that communication system 10 (and its teachings) are readily scalable and can accommodate a large number of components, as well as more complicated/sophisticated arrangements and configurations. Accordingly, the examples provided should not limit the scope or inhibit the broad teachings of communication system 10 as potentially applied to a myriad of other architectures.

It is also important to note that the steps in the preceding flow diagrams illustrate only some of the possible signaling scenarios and patterns that may be executed by, or within, communication system 10. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication system 10 in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain GGSN components, communication system 10 may be applicable to other protocols and arrangements such as any type of network access server (NAS), GPRS entry point, etc. Moreover, the present disclosure is equally applicable to various cellular and/or wireless technologies including CDMA, Wi-Fi, WiMax, etc. In addition, other example environments that could use the features defined herein include Pico and femto architectures, where intelligent inspection and mapping operations would occur for one or more users. Moreover, although communication system 10 has been illustrated with reference to particular elements and operations that facilitate the communication process, these elements and operations may be replaced by any suitable architecture or process that achieves the intended functionality of communication system 10.

What is claimed is:

1. A method, comprising:
   maintaining a correlation between a domain name and a plurality of Internet protocol (IP) addresses included in a domain name system ("DNS") response to a DNS request in connection with DNS exchange between a subscriber and a DNS server, wherein each of the IP addresses corresponds to one of a plurality of web servers associated with the domain name;
   receiving from the subscriber a packet associated with a flow;
   identifying an IP address within the packet as being one of the plurality of IP addresses included in the DNS response; and
   executing a policy decision for the subsequent flow without inspecting the contents of the subsequent flow at layer 7 based on the domain name correlated to the identified IP address, wherein the policy decision comprises charging a different rate for a particular flow.

2. The method of claim 1, wherein the correlation is stored in a table that includes a time to live (TTL) parameter associated with the IP address.

3. The method of claim 1, wherein the IP address within the packet is mapped to the domain name in order to apply the policy decision to the subsequent flow.

4. The method of claim 1, wherein the policy decision is based on an identity of the subscriber.

5. The method of claim 1, wherein the policy decision is based on the IP address associated with a particular server.

6. The method of claim 1, wherein the policy decision includes at least one of executing billing, rate limiting, and controlling access associated with the subscriber.

7. The method of claim 1, wherein the policy decision includes applying a quality of service to the subsequent flow based on a policy associated with the subscriber.

8. One or more non-transitory tangible media that includes code for execution and when executed by a processor operable to perform operations comprising:
   maintaining a correlation between a domain name and a plurality of Internet protocol (IP) addresses included in a domain name system ("DNS") response to a DNS request in connection with DNS exchange between a subscriber and a DNS server, wherein each of the IP addresses corresponds to one of a plurality of web servers associated with the domain name;
   receiving from the subscriber a packet associated with a flow;
   identifying an IP address within the packet as being one of the plurality of IP addresses included in the DNS response; and
   executing a policy decision for the subsequent flow without inspecting the contents of the subsequent flow at layer 7 based on the domain name correlated to the identified IP address, wherein the policy decision comprises charging a different rate for a particular flow.

9. The media of claim 8, wherein the correlation is stored in a table that includes a time to live (TTL) parameter associated with the IP address.

10. The media of claim 8, wherein the IP address within the packet is mapped to the domain name in order to apply the policy decision to the subsequent flow.

11. The method of claim 8, wherein the policy decision is based on an identity of the subscriber.

12. The media of claim 8, wherein the policy decision is based on the IP address associated with a particular server.

13. The media of claim 8, wherein the policy decision includes at least one of executing billing associated with the subscriber, and applying a quality of service to the subsequent flow.

14. An apparatus, comprising:
   a memory element configured to store data,
   a processor operable to execute instructions associated with the data, and
   an awareness module configured to:
      maintain a correlation between a domain name and a plurality of Internet protocol (IP) addresses included in a domain name system ("DNS") response to a DNS request in connection with DNS exchange between a subscriber and a DNS server, wherein each of the IP addresses corresponds to one of a plurality of web servers associated with the domain name;

receive from the subscriber a packet associated with a flow;
identify an IP address within the packet as being one of the plurality of IP addresses included in the DNS response; and
execute a policy decision for the subsequent flow without inspecting the contents of the subsequent flow at layer 7 based on the domain name correlated to the identified IP address, wherein the policy decision comprises charging a different rate for a particular flow.

15. The apparatus of claim 14, wherein the correlation is stored in a table that includes a time to live (TTL) parameter associated with the IP address.

16. The apparatus of claim 14, further comprising:
a policy control enforcement function (PCEF) module configured to block traffic associated with the subscriber based on the correlation.

17. The apparatus of claim 14, wherein the IP address within the packet is mapped to the domain name in order to apply the policy decision to the subsequent flow.

18. The apparatus of claim 14, further comprising:
a quality of service module configured to apply a quality of service to the subsequent flow based on a policy associated with the subscriber.

19. The apparatus of claim 14, further comprising:
one or more traffic processors configured to store one or more entries associated with a plurality of IP addresses and respective domain names.

20. The apparatus of claim 14, further comprising:
a policy and charging rules function configured to store one or more policies that affect routing decisions associated with a plurality of subscribers.

* * * * *